United States Patent [19]
Rossi, Sr.

[11] 4,378,127
[45] Mar. 29, 1983

[54] RACK AND SHELL COMBINATION FOR PICKUP TRUCK

[76] Inventor: Benedict A. Rossi, Sr., 2741 Post Rd., Twinsburg, Ohio 44087

[21] Appl. No.: 190,494

[22] Filed: Sep. 25, 1980

[51] Int. Cl.³ .......................... B62D 33/00; B60P 3/00
[52] U.S. Cl. ..................... 296/3; 224/42.42; 224/273; 224/309; 296/24 R; 296/37.6
[58] Field of Search ............... 296/3, 37.6, 10, 24 R; 224/42.42, 42.32, 273, 309; 52/143, 637; 211/60 R, 182

[56] References Cited
U.S. PATENT DOCUMENTS

| | | | |
|---|---|---|---|
| 3,594,035 | 7/1971 | Ferguson | 296/3 |
| 4,057,281 | 11/1977 | Garrett | 296/3 |
| 4,152,020 | 5/1979 | Brown et al. | 296/3 |
| 4,215,894 | 8/1980 | Sidlinger | 296/3 |

Primary Examiner—Richard A. Bertsch
Attorney, Agent, or Firm—Pearne, Gordon, Sessions, McCoy & Granger

[57] ABSTRACT

A rack is disclosed which is adapted to be installed in combination with a shell in the bed of a pickup truck. The rack comprises two opposed sets of upright posts. Each set of posts is adapted to extend in a plane generally parallel to the sidewall of the truck and outside of the sidewall. The upper portion of the rack is completed by a pair of horizontal side members extending along the top of the posts and a plurality of horizontal cross members extending between the side members. Each set of posts is supported by a base plate which is disposed horizontally along the bottom of the posts and extends inwardly from the plane of the posts to the sidewall of the truck bed. The inward portion of the base plate is fastened to the top of one of the sidewalls. The rack provides a clearance so that a shell may be mounted over the truck bed within the rack, and the rack is supported entirely by the sidewalls of the truck bed.

1 Claim, 4 Drawing Figures

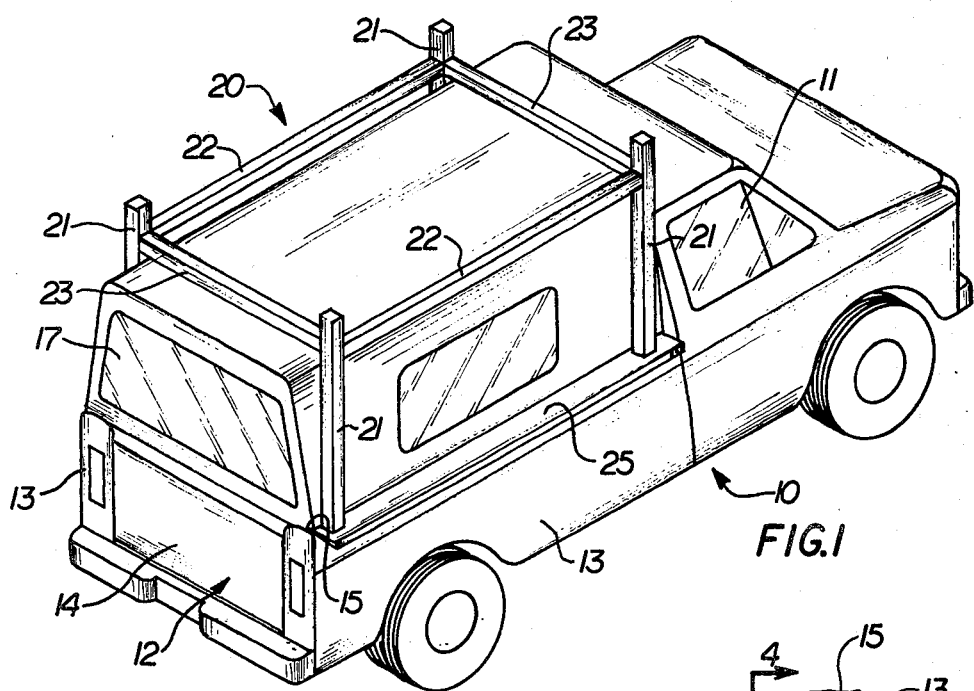
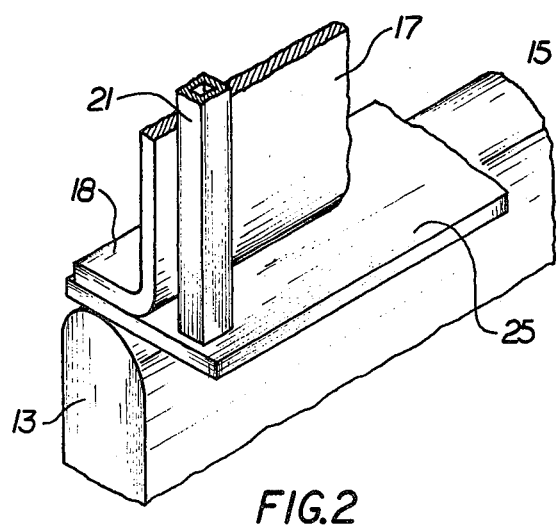
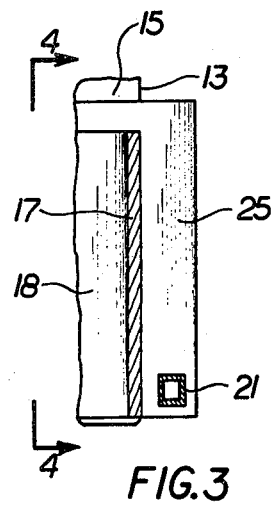
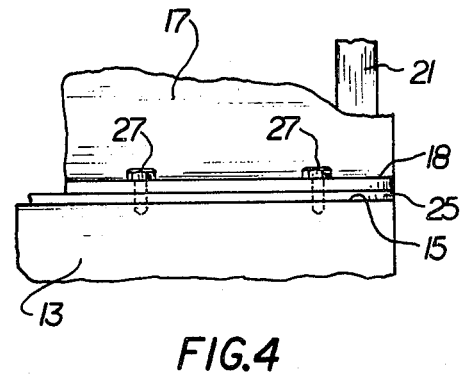

RACK AND SHELL COMBINATION FOR PICKUP TRUCK

FIELD OF THE INVENTION

This invention relates to racks which are mounted on the beds of pickup trucks, and particularly to a rack which can be used in combination with a shell on a truck bed.

BACKGROUND OF THE INVENTION

Racks for pickup trucks are well known and are commonly used by electricians, painters, plumbers, roofers, and other similar craftsman to provide a means for carrying elongated articles, such as long pipes or ladders, on a pickup truck. These racks usually comprise a number of upright posts which are inserted into post holes provided in the sidewalls of the pickup truck and extend upwardly to the height of the cab of the truck. A square frame is mounted on top of the posts and provides the carrying area for the elongated articles.

Examples of various designs for racks for pickup trucks are shown in U.S. Pat. No. 2,947,566, issued to Tower; No. 3,217,449, issued to Levere; No. 3,594,035, issued to Ferguson; No. 3,765,713, issued to Suitt; No. 4,057,281, issued to Garrett; and No. 4,138,046, issued to DeFreze.

It is often convenient to have an enclosed area in which to carry other articles and in which the articles may be protected from inclement weather and the like. Shells for covering the beds of pickup trucks are well known and provide covers of this type. An example of such a shell is shown in U.S. Pat. No. 3,897,100 to Gardner.

It has not been possible to utilize a conventional rack with a conventional shell, since each must be mounted to the sidewalls of the bed of the pickup truck body, and neither accommodates the other. It would be extremely advantageous to have the capability of carrying supplies within a covered shell and at the same time have a rack upon which longer articles could be mounted on the same pickup truck.

Several solutions have been proposed to this problem. For example, U.S. Pat. No. 2,997,330 to Boultinghouse discloses a specialized cover used in combination with a carrying rack. However, this solution requires a specially constructed shell supporting a rack, and the shell structure must be capable of supporting substantial loads. U.S. Pat. No. 2,901,286, issued to Harris, discloses a rack having a canopy or tarpaulin suspended over the bed of the pickup truck, but these coverings are flimsy and do not offer adequate protection to loads occupying the truck bed. U.S. Pat. No. 3,589,576 issued to Rinkle et al. shows a convertible rack having a tarpaulin covering, but this structure cannot perform load carrying and bed covering functions simultaneously. U.S. Pat. No. 4,170,331, issued to Faulstich, shows a rack which fits on top of a shell. However, this rack is also supported entirely by the shell, and thus requires a shell of considerable strength in order to support heavy items which may be placed on the rack. If the shell is not capable of holding these heavy items, the entire structure will fail.

SUMMARY OF THE INVENTION

The present invention provides a rack for use in combination with a shell on the bed of a pickup truck which overcomes the problem of the prior art, and provides other advantages heretofore not achieved. The present invention provides a rack which differs substantially from that disclosed in the prior art by providing a clearance within the rack in which a conventional shell may be mounted. The rack of the present invention does not require a specially constructed shell, and may therefore be used in combination with any conventional shell. If a user wishes to utilize a rack in combination with a shell, the user need only employ the rack of the present invention along with a shell which he may already have, and the additional purchase of a specially constructed shell is not required. While the rack of the present invention provides unique capabilities of utilization with a shell, it is evident that the rack functions as a conventional rack and may be used without the shell.

The rack of the present invention is also supported directly on the sidewalls of the truck bed so that heavy items may be supported in the rack without relying upon the strength of the shell to support such items. In addition, the rack of the present invention and the conventional shell to be used with the rack are both bolted to the top of the truck bed sidewalls, and either may be easily removed without disturbing the other by simply removing the bolts and sliding either the shell or the rack off the bed.

These and other advantages are provided by the present invention of a rack adapted to be installed in combination with the shell in the bed of a pickup truck. The rack comprises two opposed sets of upright posts. Each set is adapted to extend upwardly on a plane generally parallel to one of the sidewalls of the truck and outside of the sidewall. A pair of horizontal side members is provided, each of which extends along the top of one of the sets of posts and is supported thereby. Extending between the side members is a plurality of horizontal cross members. A pair of base plates are provided, each of which is disposed horizontally along the bottom of one of the sets of posts and extends inwardly from the plane of the posts to the sidewall of the truck bed. Means are provided for fastening the inward portions of each of the base plates to the top of one of the sidewalls.

BRIEF DESCRIPTION OF THE DRAWINGS

FIG. 1 is a perspective view of a pickup truck having a rack of the present invention installed in combination with a shell.

FIG. 2 is a detailed, perspective view of the bottom portion of the rack showing its mounting to the sidewall of the pickup truck bed.

FIG. 3 is a top plan view of the portion of FIG. 2.

FIG. 4 is an inside, elevational view, taken along line 4—4 of FIG. 3.

DETAILED DESCRIPTION OF THE PREFERRED EMBODIMENT

Referring more particularly to the drawings, and initially to FIG. 1, there is shown a conventional pickup truck 10 having a forward cab 11 and a rearward bed 12 defined by a pair of sidewalls 13 and a tailgate 14. Each of the sidewalls 13 is conventionally provided with a plurality of vertically extending stake holes or post holes within which rack posts may be inserted and has a flat upper surface 15 which may be used, for example, for mounting of a shell, camper, or other structure within the bed of the truck. As shown in FIG. 1, a conventional shell 17 is mounted in the bed 12 of the truck. The shell 17 provides a closed top to the bed and has an open bottom, and is typically mounted directly on the top surface 15 of the sidewalls 13. The sides of the shell 17 extend upwardly directly over the sidewalls 13 and each side of the shell is provided with an inwardly extending flange 18 (FIG. 2) which extends along the top surface 15 of one of the sidewalls 13 so that the shell is supported on the sidewalls. Each flange 18 is provided with a plurality of holes through which bolts may be inserted to mount the shell to the truck. Typically, bolts are inserted through the flange 18 and the top surface 15 of the sidewall to anchor the shell 17 to the truck bed.

In accordance with the present invention, a rack 20 is provided which may be mounted in combination with the shell 17 on the pickup truck bed 12. The rack 20 comprises two sets of upright posts 21 which extend vertically on each side of the pickup truck bed 12. Each set of posts 21 extends in a plane outside of the sidewalls 13 to provide clearance for the sides of the shell 17, which extend upwardly directly over the sidewalls 13. As shown in FIG. 1, two posts 21 are provided on each side of the truck. However, more posts could be provided on each side if desired.

Extending between the posts 21 on each side of the truck is an upper side member 22. Each side member 22 extends generally horizontally between the posts 21 along the sides of the pickup truck bed 12 and supports the posts on each side. Cross members 23 extend horizontally between the side members 22 and the front and the back of the rack. The cross members 23 extend horizontally. The cross members 23 connect the posts 21 on each side and the side members 22 and provide the support for articles which will be carried on the rack, such as ladders, long pipe or conduit, siding material, or other items. The cross members 23 extend across the rack at a height greater than the height of the conventional shell 17, which is typically the same height as that of the truck cab 11. The rack thus provides a clearance for the shell 17 so that the shell may fit beneath the cross members 23. As shown in the illustrated embodiment of the invention, the cross members 23 extend between the posts 21. However, the cross members 23 may also extend directly between the side members 22. While two cross members 23 are shown in FIG. 1, additional cross members may be provided in order to provide adequate support for the articles being carried in the rack. The posts 21, the side members 22, and the cross members 23 may be formed of tubular steel or other suitable material which is conventionally used in rack construction.

In accordance with the present invention, the posts 21 are not mounted directly to the sidewalls 13, but are mounted to base plates 25 each of which extends inwardly from the plane of one of the sets of posts 21 to the adjacent sidewall 13 of the truck, and help provide clearance in order to accommodate the shell 17. Each of the base plates 25 is elongated and extends horizontally along the top surface 15 of the sidewalls 13, and extends laterally outwardly beyond the sidewalls 13. The bottom of the posts 21 are securely attached, such as by welding, along the outer portion of each base plate 25. The inward portion of each base plate 25 is then secured to the sidewalls 13. In accordance with conventional means for mounting shells, the base plate 25 is bolted to the top surface 15 of the sidewall by bolts 27 (FIG. 4). The inward portion of each base plate 25 is provided with holes which correspond to the holes in the flange 18 of the shell. The bolts 27 are inserted through the holes in the flange 18 of the shell 17 and through the corresponding holes in the inward portion of the base plate 25 and into the top surface 15 of the sidewalls 13 to secure both the rack 20 and the shell 17 to the truck sidewalls 13.

The rack of the present invention thus provides a structure which is capable of supporting articles for which a rack is generally used but which provides clearance within the rack so that a conventional shell may be mounted on the pickup truck simultaneously with the rack. In addition, either the rack or the shell may be removed without disturbing the other. To remove either the rack or the shell, the bolts 27 are removed and either the rack or the shell may be slid rearwardly off the pickup truck bed without disturbing the other.

While the invention has been shown and described with respect to a specific embodiment thereof, this is intended for the purposes of illustration rather than limitation and other variations and modifications to the specific shown and described will be apparent to those skilled in the art. Accordingly, this patent is not to be limited to the specific embodiment shown and described, nor in any other way which is inconsistent with the extent to which the progress in the art has been advanced by this invention.

What is claimed is:

1. A combination rack and shell assembly for installation in the bed of a pickup truck, which comprises:

two opposed sets of upright posts, each set extending upwardly in a plane generally parallel to one of the sidewalls of the truck and outside of the sidewall;

a pair of horizontal side members each extending along the top of one of the sets of posts and supported thereby;

a plurality of horizontal cross members extending between the side members;

a pair of base plates each disposed horizontally along and fixedly attached to the bottom of one of the sets of posts and extending inwardly from the plane of the posts to the sidewall of the truck bed so that the base plates can be slidably moved on the top of the sidewalls;

a shell having a boxlike shape with an open bottom supported on the sidewalls of the truck bed, the shell having a pair of inwardly extending flanges each of which extends along the side of the shell at the bottom thereof, each flange longitudinally contiguous with the inward portion of one of the base plates, each flange being slidably movable with respect to the adjacent base plate and with respect to the sidewall, so that the shell can be removed without disturbing the base plates, and so that the base plate and attached post can be removed without disturbing the shell; and means for fastening the inward portions of each of the base plates and the flanges to the top of one of the sidewalls to prevent any sliding movement thereof.

* * * * *